United States Patent
Meyer et al.

(10) Patent No.: US 8,869,402 B2
(45) Date of Patent: Oct. 28, 2014

(54) METHODS FOR MANUFACTURING A TOOL EQUIPMENT INCLUDING A PLURALITY OF REMOVABLE MODULES AND FOR MOLDING A FUSELAGE PANEL

(75) Inventors: Cédric Meyer, Fonsorbes (FR); Jocelyn Gaudin, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 378 days.

(21) Appl. No.: 12/968,579

(22) Filed: Dec. 15, 2010

(65) Prior Publication Data

US 2012/0023727 A1  Feb. 2, 2012

(51) Int. Cl.
*B21D 53/88* (2006.01)
*B29C 33/30* (2006.01)
*B29C 33/76* (2006.01)
*B29C 70/30* (2006.01)
*B29C 70/54* (2006.01)
*B29L 31/30* (2006.01)

(52) U.S. Cl.
CPC .............. *B29C 33/76* (2013.01); *Y02T 50/433* (2013.01); *B29C 33/306* (2013.01); *B29C 70/30* (2013.01); *Y02T 50/43* (2013.01); *B29C 70/54* (2013.01); *B29L 2031/3082* (2013.01)
USPC .......... 29/897.2; 29/897; 29/407.05; 244/120

(58) Field of Classification Search
CPC ........... B64F 5/0009; B64C 2001/0072; Y02T 50/433; Y02T 50/43
USPC ........... 29/401, 897.2, 897.32; 249/155–157, 249/159, 160, 168, 102, 184, 120; 244/119, 244/120, 132
See application file for complete search history.

(56) References Cited

U.S. PATENT DOCUMENTS

| 4,363,617 | A | 12/1982 | Hirsekorn |
| 5,242,523 | A * | 9/1993 | Willden et al. ............... 156/285 |
| 7,935,289 | B2 * | 5/2011 | Anderson et al. ............. 264/257 |
| 7,967,250 | B2 * | 6/2011 | Lobato et al. ................. 244/119 |
| 8,256,714 | B2 * | 9/2012 | Zhao ............................. 244/120 |
| 8,303,758 | B2 * | 11/2012 | Chapman et al. ............. 156/287 |

(Continued)

FOREIGN PATENT DOCUMENTS

| EP | 0631855 | 1/1995 |
| EP | 2128017 | 12/2009 |

(Continued)

OTHER PUBLICATIONS

French Republic Institut National De La Propriete Industrielle, Preliminary Search Report, FR 0906076, Jul. 27, 2010.

*Primary Examiner* — Minh Trinh
(74) *Attorney, Agent, or Firm* — Wood, Herron & Evans, LLP

(57) ABSTRACT

A method for manufacturing a tool equipment used in molding a panel for a fuselage of an aircraft from a composite material is provided. The method includes manufacturing a mold such that a fixed part includes a hub and an intermediary member. A plurality of removable modules which are able to be mounted on this fixed part are also manufactured and then fastened to the fixed part so as to modify an external surface upon which composite material is laid-up or draped during the molding of the panel.

15 Claims, 3 Drawing Sheets

(56) References Cited

U.S. PATENT DOCUMENTS

| | | |
|---|---|---|
| 8,490,286 B2 * | 7/2013 | Meyer et al. .................. 29/897.2 |
| 2008/0149768 A1 * | 6/2008 | Sarh .............................. 244/120 |
| 2008/0283668 A1 * | 11/2008 | Martinez Cerezo et al. . 244/133 |
| 2009/0217529 A1 * | 9/2009 | Cerezo et al. ................. 29/897.2 |
| 2010/0000667 A1 * | 1/2010 | Funnell ......................... 156/189 |
| 2010/0276543 A1 * | 11/2010 | Schimmler et al. ........ 244/129.5 |
| 2011/0017389 A1 * | 1/2011 | Boyeldieu ..................... 156/245 |
| 2011/0300333 A1 * | 12/2011 | Kallinen ....................... 428/138 |
| 2012/0180942 A1 * | 7/2012 | Chapman et al. ............. 156/212 |

FOREIGN PATENT DOCUMENTS

| | | |
|---|---|---|
| WO | 9845100 | 10/1998 |
| WO | 2007148301 | 12/2007 |
| WO | 2008020158 | 2/2008 |
| WO | 2009150401 | 12/2009 |

* cited by examiner

METHODS FOR MANUFACTURING A TOOL EQUIPMENT INCLUDING A PLURALITY OF REMOVABLE MODULES AND FOR MOLDING A FUSELAGE PANEL

TECHNICAL FIELD

The present invention relates to a method of forming a tool equipment including one mould intended to be used for manufacturing a panel in a composite material.

Although not exclusively, the present invention more particularly applies to a tool equipment to be used for manufacturing a panel of an aircraft fuselage, including of a transport airplane.

BACKGROUND

A panel manufacturing process with a composite material comprises, more particularly, a skin draping step wherein two types of monobloc moulds can be used:
- a so-called male mould, with which stiffeners are initially positioned the case being. Such stiffeners could be, more specifically, pre-cooked. In the case of pre-cooked stiffeners, it is convenient to add a glue ply at the skin/stiffener interfaces. For draping, the interior of the panel skin is first draped, and the exterior is subsequently processed; and
- a so-called female mould to be used for draping first the exterior of the skin (aerodynamic surface). Once the skin is draped, the stiffeners are positioned on the internal side.

Using a female tool equipment (that is, comprising a female mould) has numerous drawbacks:
- it does not allow to drape fuselage sections exceeding 180°. In particular, such female tool equipment cannot be used for manufacturing a <<one-shot>> fuselage section;
- a female mould is bulkier than a male mould (by approximately 20%). It is therefore heavier and more expensive. Moreover, the warming up time in an autoclave is longer (increase of recurrent costs and manufacturing cycles), and it requires autoclaves of larger dimensions (increase of not recurrent costs); and
- a female mould requires the use of a ribband maintaining tool equipment being complex contrarily to a male mould, the ribband footprints of which are directly machined in the mould.

The above mentioned drawbacks relating to the use of female moulds (costs, implementation) result in male moulds tending to become more and more widely used.

However using a male tool equipment involves two problems compared to using a female tool equipment:
a) the external surface of the fuselage being in contact with the mould of a female tool equipment, the resulting state of the surface is perfect, ensuring more specifically a low drag; which is not the case for a male tool equipment; and
b) in the case of manufacturing an airplane fuselage panel, manufacturing the female tool equipment can start as soon as the aerodynamic profile of the airplane is set rigidly; as opposed to a male mould, for which the final design of the airplane should be set rigidly before being able to design the tool equipment (as the interior of the skin is first draped).

The above mentioned problem a) of a male tool equipment, related to the surface state of the external skin, could be overcome using so-called <<cawl-plates>>, that are arranged on the external surface with the aim to homogenize the pressure applied on the coating and to properly drain the resin.

On the other hand, the problem b) related to the manufacturing time of a male tool equipment for manufacturing airplane fuselage plane, including of a transport airplane, is not overcome.

Indeed, making the tool equipment being necessary for manufacturing a fuselage is a long phase, generally of the order of eighteen months. For a male tool equipment, it is necessary that the design of the airplane should be definitely fixed, before launching the detailed design of the tool equipment. In particular, the local reinforcing members under ribbands and frames, the local reinforcing members at the windows and the door frames, . . . should be set rigidly, as they influence the external diameter of the mould in numerous areas.

Having to wait for the final definition of such a design, before being able to initiate designing and manufacturing the male tool equipment, postpones by approximately eighteen months assembling the fuselage (from the composite panels obtained through the male tool equipment), which is not consistent either with market demands or with the objectives of the airplane manufacturers.

Such a problem does not occur with a female tool equipment, for which only the final definition of the external surface, being set rigidly much earlier than designing the airplane (generally by a few years), is necessary for initiating manufacturing such female tool equipment.

The present invention relates to a tool equipment of the male type intended for manufacturing a composite panel, in particular an aircraft fuselage panel, allowing to overcome the above mentioned drawbacks, and more particularly, to be able to be achieved much earlier in the manufacturing cycle of an aircraft fuselage that an usual male tool equipment.

SUMMARY OF THE INVENTION

To this end, according to this invention, said male tool equipment comprising a mould of the male type equipped with a hub, is remarkable in that said mould comprises, in addition, an intermediary member surrounding at least partially said hub and being integral with the latter via the internal side thereof, and a plurality of removable modules which are able to be located side by side and fastened on the external side of said intermediary member so that the external surface of the thus formed assembly (intermediary member and modules) matches the internal surface of the panel to be manufactured.

Thus, by means of this invention, a male tool equipment is obtained, comprising a fixed part (hub and intermediary member) onto which removable exchangeable modules can be fastened, the accurate definition of such modules being able to progress with the definition of the aircraft.

Consequently, a male tool equipment is obtained, being flexible in that the manufacture thereof can be initiated, that is to say that of said fixed part, upstream with respect to manufacturing a usual monobloc male tool equipment, while allowing to take into account changes of design occurring later in the development cycle of the aircraft, such changes of design being then integrated in the exchangeable modules that can be manufactured more easily, quicker and with reduced costs. Such a flexibility of the tool equipment allows keeping possibilities of a later progress of the design, including for reducing the mass or reinforcing some areas.

The present invention also facilitates, because of the modularity of the tool equipment, repair and/or maintenance thereof. Indeed, any worn-out or damaged module can be easily replaced, which is not the case for usual monobloc tools.

Within the scope of the present invention, the modules can be fastened on different ways on the intermediary member, and more specifically by mechanical fasteners (screws, etc.) and/or a magnetic system.

Moreover, in particular in order to avoid phenomena related to relative thermal expansions, advantageously, said intermediary member and said removable modules are made in the same material.

Although not exclusively, the tool equipment according to this invention is more particularly intended for manufacturing a panel of an aircraft fuselage, including of a transport airplane. In this case, in a particular embodiment, the tool equipment includes at least some of the following types of modules:

a module for at least one reinforced area at the edge of the fuselage panel;
a module for at least one reinforced area under ribbands and frames;
a module for at least one reinforced area at a window; and
a module defining a door frame.

The present invention further relates to a method for achieving a tool equipment being intended for manufacturing a panel for an aircraft, including a fuselage panel, said tool equipment comprising a mould of the male type including a fixed part (comprising a hub and an intermediary member) and a plurality of removable modules which are able to be fastened on said fixed part. According to this method:

said fixed part is achieved, in an upstream phase of the development cycle of the aircraft, being prior to the final definition of the design of the aircraft; and
said removable modules are achieved subsequently to said final definition of the design of the aircraft, said modules being then fastened on said fixed part of the tool equipment.

Thus, using such a method, the achievement of said fixed part can be initiated well upstream with respect to manufacturing usual monobloc male tool equipment, while being able to take into account changes of design occurring subsequently in the development cycle of the aircraft, such changes of design being integrated into the exchangeable modules.

Furthermore, advantageously, upon a modification of the design of the aircraft (generating a new design), the removable modules, on said fixed part of the tool equipment, being affected by such a modification, are replaced by new modules being achieved so as to have the appropriate characteristics being adapted to such a new design.

Thus, if, for instance, a portion of a panel (or of the fuselage) should be modified, more specifically, reinforced, at the level of a particular area of the panel, all that is necessary is to define and machine one or more new modules having the appropriate characteristics, and to fasten them at the level of the part of the mould corresponding to such a particular area of the panel.

BRIEF DESCRIPTION OF THE DRAWINGS

The FIGS. of the appended drawing will better explain how this invention can be implemented. In these FIGS., identical reference numerals relate to same components.

DETAILED DESCRIPTION

Figure 1:
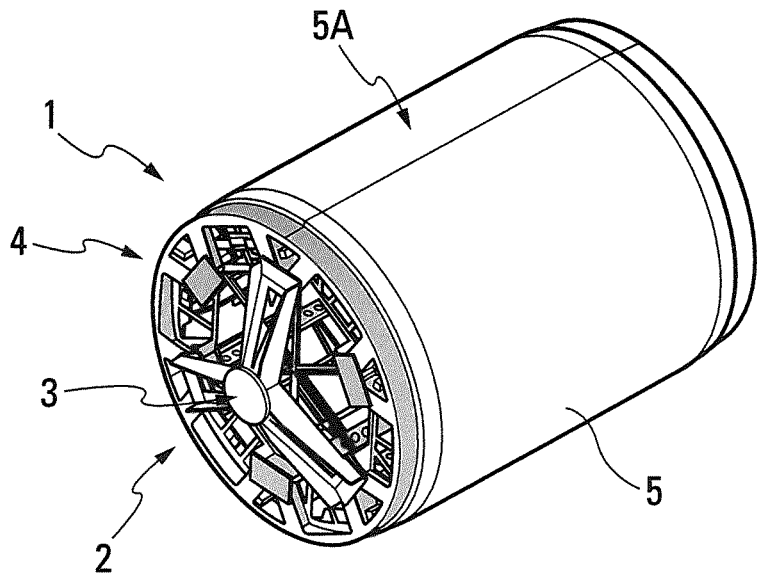
FIG. 1 is a schematic perspective view, of the fixed part of a tool equipment according to this invention.

The tool equipment 1 according to this invention and schematically shown, in part, on FIG. 1, is intended for manufacturing a panel in a composite material. Preferably, such a panel is a fuselage or an aerofoil panel of an aircraft, including of a transport airplane. However, such a panel can also be a panel in a composite material used in another technical field, such as building railway vehicles for example.

Such tool equipment 1 comprises a mould 2 of the male type being provided, usually, with a hub 3.

Such tool equipment 1 is intended for draping a skin in a composite material. For achieving such a draping, the tool equipment 1 cooperates with a positioning head (not shown) being intended for a pre-impregnated fibre of resin to be laid down on said mould 2. To this end, a relative movement is generated between the tool equipment 1 and the positioning head. Generally, the tool equipment 1 is fixed and the positioning head is shifted with respect to the latter, the opposite situation being also able to be implemented. After such a deposit has been achieved, the laid-down material, which is a thermosetting one, is heated through current techniques that will not be further described.

As said tool equipment 1 is of the male type, the part of the panel being in contact with the external side of the mould 2 corresponds to the internal surface of such a panel, in particular when it is intended to manufacture a section of an aircraft fuselage, including, of a transport airplane. Consequently, with such tool equipment 1 of the male type, the interior of the skin of the fuselage is first draped and the exterior is draped later on (corresponding to the aerodynamic external surface). Said tool equipment 1 can be used in any current technique using a male tool equipment of this type.

Figure 2:
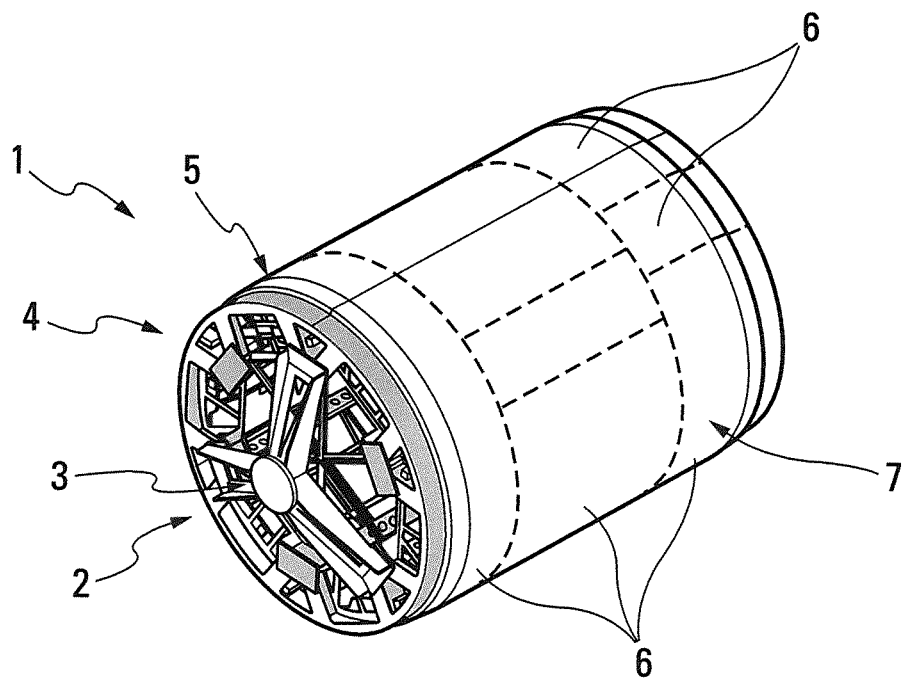
FIG. 2 shows a fixed part of a tool equipment, on which exchangeable modules are schematically represented.

According to the invention, the mould 2 of the tool equipment 1 includes:

a fixed part 4 which comprises said hub 3 (being shown in grey on FIG. 1) and an intermediary plate shaped member 5, matching the external shape of said hub 3 and being fastened on at least one part of the latter; and
a plurality of removable modules 6 which are able to be placed side by side and fastened on the external side 5A of said intermediary member 5, as schematically shown on FIG. 2, so that the external surface 7 of the assembly formed by said intermediary member 5 and said removable modules 6 matches the internal surface of the (composite) panel to be manufactured.

Consequently, through this invention, and including by the combination of a non removable fixed part 4 and removable modules 6, a male tool equipment 1 is obtained, being flexible. Thus, manufacturing said fixed part 4 can be initiated much earlier than that of a usual monobloc male tool equipment and this, before the final design of the aircraft is set rigidly. Furthermore, said tool equipment 1 allows taking into account changes of design occurring later in the development cycle of the aircraft. Such changes of design are, indeed, integrated into the exchangeable modules 6, which can be achieved more easily, quicker and at a reduced cost. The accurate definition of such modules 6 is able to progress together with the definition of the aircraft. Such a flexibility of the tool equipment 1 allows keeping possibilities of a later progress of the design, including for reducing the mass or reinforcing some areas.

Generally, for achieving a section of fuselage, a plurality of bent panels is built (using a tool equipment 1 having only one part of the external surface being used for draping), which are subsequently fastened so as to build said section. However, in a particular embodiment, it is also possible to provide a tool equipment 1 having the above mentioned characteristics according to this invention and allowing a one shot fuselage section to be reached.

In a particular embodiment:
said hub 3 is made of steel; and
said intermediary member 5 is made, for example, of aluminium, of a material referred to as INVAR, being a very low thermal expansion coefficient metallic material, or of a material referred to as BMI being a high temperature composite material.

Furthermore, in particular to avoid phenomena related to relative thermal expansions, said intermediary member 5 and said removable modules 6 are made, preferably, of the same material.

As illustrated in FIG. 2, the removable modules 6 are able to be fastened, while being distributed along the circumference and/or along the longitudinal axis of said fixed part 4, the axis of which corresponds to that of the hub 3.

Figure 3:
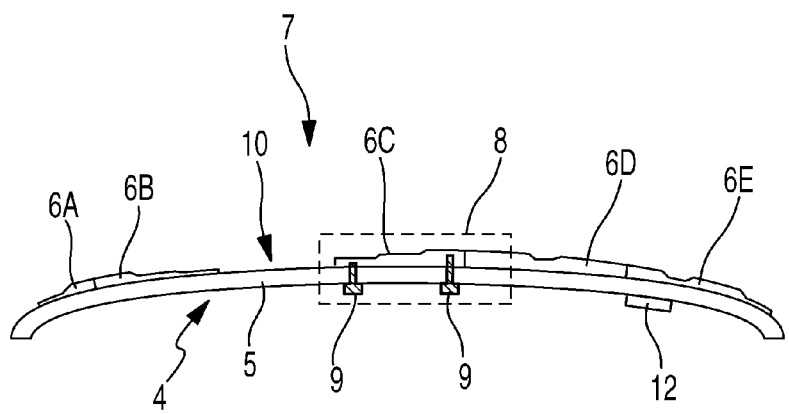
FIG. 3 schematically illustrates a part of a tool equipment according to this invention.
Figure 4:
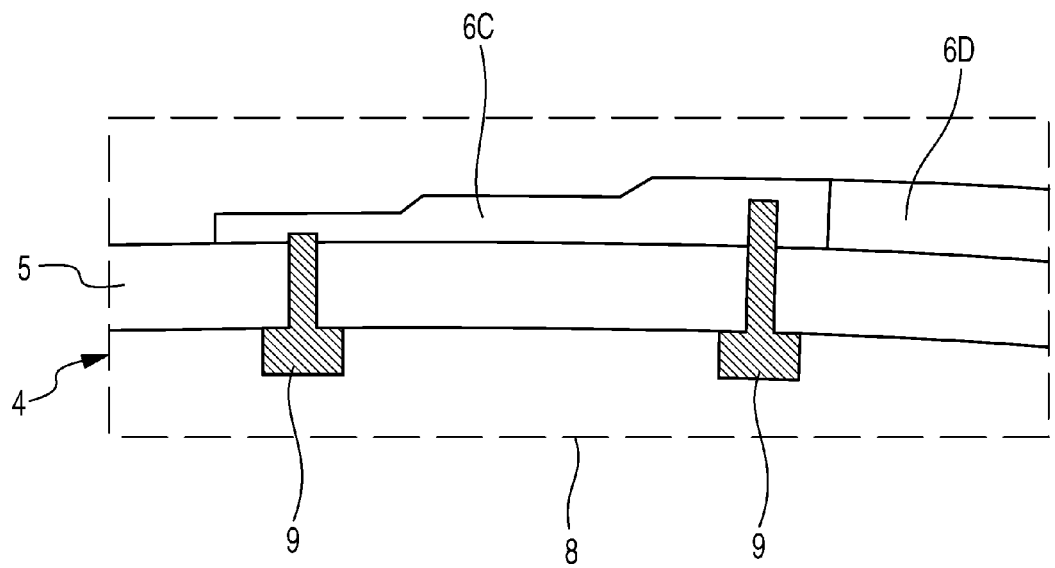
FIG. 4 shows an area of FIG. 3, on which fastening means are illustrated.

In a particular embodiment, shown in FIG. 4 (illustrating the rectangular area 8 in broken lines in FIG. 3), the modules 6 are fastened to the intermediary member 5 by mechanical fasteners comprising, for example, screws 9.

Furthermore, in a another, not shown, embodiment, some or all of the modules 6 could be fastened to the intermediary member 5 by a current magnetic system 12 (shown schematically).

Thus, if, for any particular reason, a portion of a panel (or of the fuselage) should be modified, for instance, reinforced at the level of a particular area of the panel, all that is necessary is to define and machine one or more new modules 6 having the appropriate characteristics, and to fasten the new modules 6 at the level of the part of the mould 2 corresponding to such a particular area of the panel. This could be the case, more specifically, if the edge of a panel should be reinforced.

The present invention also facilitates, because of the modularity of the tool equipment 1, repair and/or maintenance thereof. Indeed, any worn-out or damaged module 6 can be easily replaced, which is not the case for an usual monobloc tool equipment.

It is to be noticed that the external surface 7 of the male tool equipment 1, having a shape matching that of the internal surface of the panel to be manufactured, could be completely covered with modules 6, or being only partially covered with such modules 6, the remainder of the surface being, in such a case, formed by the external side 5A of the intermediary member 5, as illustrated, for instance, for an area 10 in FIG. 3.

In the example of FIG. 3, different types 6A, 6B, 6C, 6D, and 6E of modules 6 for a tool equipment 1 are illustrated for manufacturing part of the fuselage of an airplane. As an illustration:
the module 6A could be a module for reinforcing the edge of a panel;
the modules 6B and 6C could be modules for reinforcing a door;
the module 6D could be a module for reinforcing under ribbands; and
the module 6E could be a combined module for reinforcing under ribbands and for reinforcing the edge of a panel.

Figure 5:
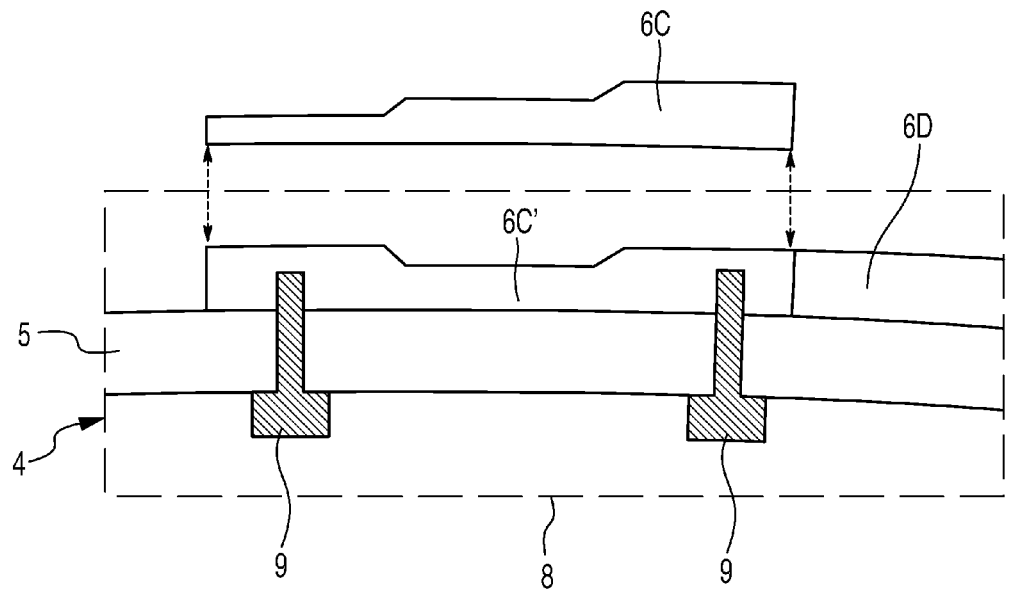
FIG. 5 shows the area of FIG. 3 with a schematic representation of a replacement of one of the modules with a different design of module when the final design of the fuselage is modified.
Figure 6:
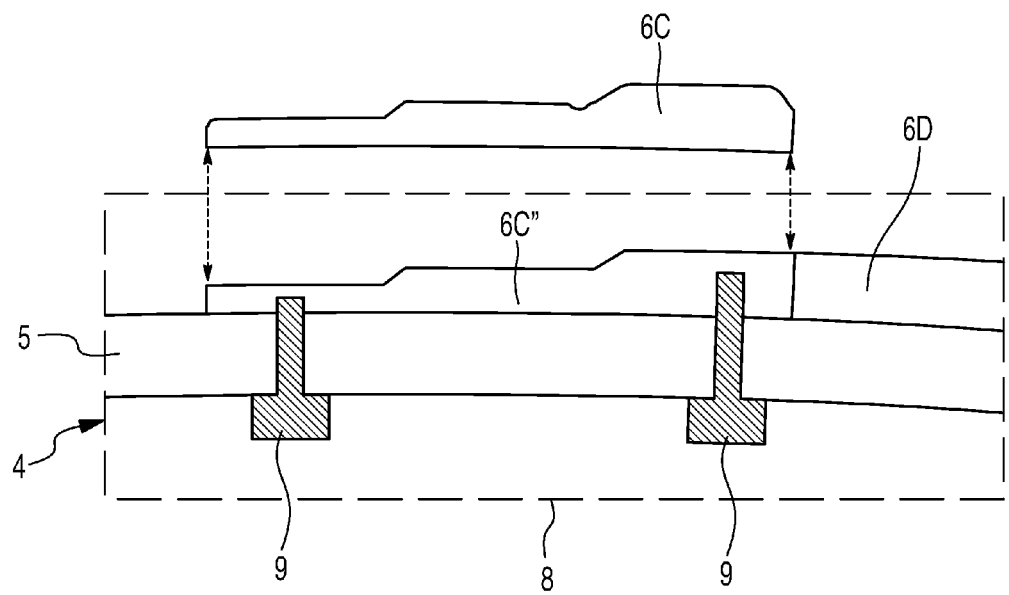
FIG. 6 shows the area of FIG. 3 with a schematic representation of a replacement of one of the modules when the module is worn out or damaged.

As described above, any of the modules 6 may be replaced when necessary. For example, FIG. 5 schematically illustrates a replacement of the module 6C with a new module 6C' having a different shape (for example, a shape like module 6D) that could be performed when the final design of the fuselage to be formed with the tool equipment 1 is modified. In another example, FIG. 6 schematically illustrates a replacement of the module 6C with a new module 6C'' having the same shape that could be performed when the original module 6C is worn out or damaged from the molding process.

The invention claimed is:

1. A method for manufacturing a tool equipment intended for use during a molding of a fuselage panel for an aircraft performed during a development cycle for the aircraft, wherein the molding of the fuselage panel occurs after a selection of a final design for the fuselage panel performed during the development cycle, the tool equipment defines a mould of male type including a fixed part and a plurality of removable modules which are able to be fastened on the fixed part, and the method comprises:
manufacturing the fixed part so as to include a hub and an intermediary member having an internal side connected to the hub and an external side defining a solid external surface sized to receive lay-up or draping of material during molding of the fuselage panel, the manufacturing of the fixed part performed during a first phase of the development cycle of the aircraft, the first phase being prior to the selection of the final design for the fuselage panel;
manufacturing the plurality of removable modules during a second phase of the development cycle of the aircraft, the second phase being subsequent to the selection of the final design for the fuselage panel; and
fastening the plurality of removable modules to the external side of the intermediary member of the fixed part during the second phase of the development cycle of the aircraft, thereby finishing assembly of the tool equipment, which is used during molding of the fuselage panel, and thereby modifying the solid external surface to provide varying contours of an inner surface of the fuselage panel during molding of the fuselage panel.

2. The method according to claim 1, wherein when a modification of the final design of the aircraft occurs after the selection of the final design of the aircraft and after finishing assembly of the tool equipment, thereby requiring the tool equipment to produce a fuselage panel with a different design or contour, the method further comprises:
removing selected ones of the plurality of the removable modules that are inconsistent with the modification of the final design of the aircraft from the intermediary member of the fixed part by unfastening the selected ones from the tool equipment; and
replacing the selected ones of the plurality of the removable modules with new modules having characteristics consistent with the modification of the final design of the aircraft by fastening the new modules to the external side of the intermediary member of the fixed part, thereby finishing assembly of the tool equipment as modified consistent with the modification of the final design of the aircraft.

3. The method according to claim 1, wherein manufacturing the fixed part further comprises:
manufacturing the fixed part such that the intermediary member surrounds the hub and is integral with the hub at the internal side thereof.

4. The method according to claim 1, wherein fastening the plurality of removable modules further comprises:

fastening at least one of the plurality of modules to the intermediary member by mechanical fasteners.

5. The method according to claim 1, wherein fastening the plurality of removable modules further comprises:
fastening at least one of the plurality of modules to the intermediary member by a magnetic system.

6. The method according to claim 1, wherein each of the steps of manufacturing the fixed part and manufacturing the plurality of removable modules further comprises:
forming the intermediary member and the plurality of removable modules from the same material.

7. The method according to claim 1, wherein manufacturing the plurality of removable modules further comprises providing at least some of the following types of modules:
a module configured to form at least one reinforced area at an edge of the panel during molding of the fuselage panel;
a module configured to form at least one reinforced area under ribbands and frames during molding of the fuselage panel;
a module configured to form at least one reinforced area at a window during molding of the fuselage panel; and
a module configured to form a door frame during molding of the fuselage panel.

8. The method according to claim 1, wherein when selected ones of the plurality of the removable modules become damaged or worn out during the development cycle for the aircraft by the molding of the fuselage panel, the method further comprises:
repairing the tool equipment by performing the following steps:
removing the selected ones of the plurality of the removable modules that are damaged or worn out from the intermediary member of the fixed part by unfastening the selected ones from the tool equipment; and
replacing the selected ones of the plurality of the removable modules with new modules that are manufactured consistent with the final design of the aircraft by fastening the new modules to the external side of the intermediary member of the fixed part, thereby finishing repair of the tool equipment.

9. A method for manufacturing a tool equipment intended for use during a molding of a fuselage panel for an aircraft performed during a development cycle for the aircraft, wherein the molding of the fuselage panel occurs after a selection of a final design for the fuselage panel performed during the development cycle, the tool equipment defines a mould of male type including a fixed part and a plurality of removable modules which are able to be fastened on the fixed part, and the method comprises:
manufacturing the fixed part so as to include a hub and an intermediary member, the manufacturing of the fixed part performed during a first phase of the development cycle of the aircraft, the first phase being prior to the selection of the final design for the fuselage panel;
manufacturing the plurality of removable modules during a second phase of the development cycle of the aircraft, the second phase being subsequent to the selection of the final design for the fuselage panel; and
fastening the plurality of removable modules to the fixed part after manufacturing the plurality of removable modules, thereby finishing assembly of the tool equipment, which is used during molding of the fuselage panel, wherein manufacturing the plurality of removable modules further comprises providing at least some of the following types of modules:
a module configured to form at least one reinforced area at an edge of the panel during molding of the fuselage panel;
a module configured to form at least one reinforced area under ribbands and frames during molding of the fuselage panel;
a module configured to form at least one reinforced area at a window during molding of the fuselage panel; and
a module configured to form a door frame during molding of the fuselage panel.

10. The method according to claim 9, wherein when a modification of the final design of the aircraft occurs after the selection of the final design of the aircraft and after finishing assembly of the tool equipment, thereby requiring the tool equipment to produce a fuselage panel with a different design or contour, the method further comprises:
removing selected ones of the plurality of the removable modules that are inconsistent with the modification of the final design of the aircraft from the intermediary member of the fixed part by unfastening the selected ones from the tool equipment; and
replacing the selected ones of the plurality of the removable modules with new modules having characteristics consistent with the modification of the final design of the aircraft by fastening the new modules to the external side of the intermediary member of the fixed part, thereby finishing assembly of the tool equipment as modified consistent with the modification of the final design of the aircraft.

11. The method according to claim 9, wherein manufacturing the fixed part further comprises:
manufacturing the fixed part such that the intermediary member surrounds the hub and is integral with the hub.

12. The method according to claim 9, wherein fastening the plurality of removable modules further comprises:
fastening at least one of the plurality of modules to the intermediary member by mechanical fasteners.

13. The method according to claim 9, wherein fastening the plurality of removable modules further comprises:
fastening at least one of the plurality of modules to the intermediary member by a magnetic system.

14. The method according to claim 9, wherein each of the steps of manufacturing the fixed part and manufacturing the plurality of removable modules further comprises:
forming the intermediary member and the plurality of removable modules from the same material.

15. The method according to claim 9, wherein when selected ones of the plurality of the removable modules become damaged or worn out during the development cycle for the aircraft by the molding of the fuselage panel, the method further comprises:
repairing the tool equipment by performing the following steps:
removing the selected ones of the plurality of the removable modules that are damaged or worn out from the intermediary member of the fixed part by unfastening the selected ones from the tool equipment; and
replacing the selected ones of the plurality of the removable modules with new modules that are manufactured consistent with the final design of the aircraft by fastening the new modules to the external side of the intermediary member of the fixed part, thereby finishing repair of the tool equipment.

* * * * *

UNITED STATES PATENT AND TRADEMARK OFFICE
CERTIFICATE OF CORRECTION

| | | Page 1 of 1 |
|---|---|---|
| PATENT NO. | : 8,869,402 B2 | |
| APPLICATION NO. | : 12/968579 | |
| DATED | : October 28, 2014 | |
| INVENTOR(S) | : Cédric Meyer et al. | |

It is certified that error appears in the above-identified patent and that said Letters Patent is hereby corrected as shown below:

Please correct the Title Page as follows:

(30) Foreign Application Priority Data: add --Dec. 16, 2009 (FR) 0906076--

Signed and Sealed this
Eleventh Day of August, 2015

Michelle K. Lee
*Director of the United States Patent and Trademark Office*